June 2, 1931.  J. A. FRIED  1,808,031
ELECTRICAL CONDENSER
Original Filed Oct. 22, 1924  3 Sheets-Sheet 3
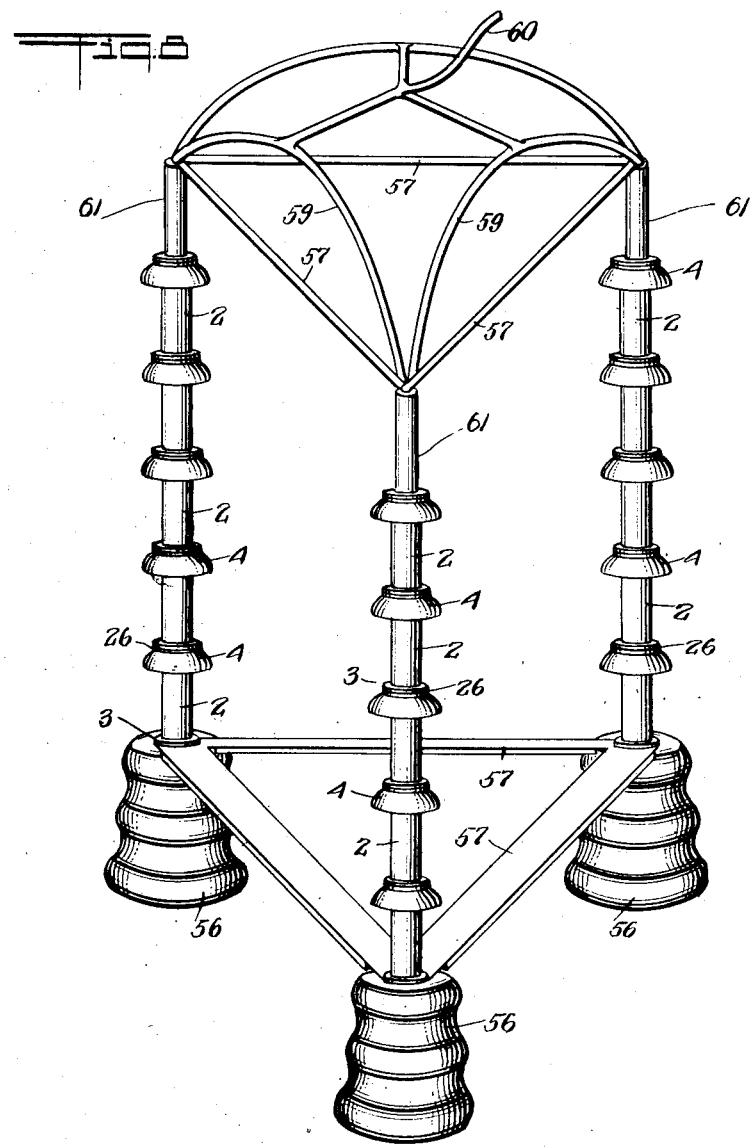
INVENTOR
JOSEPH A. FRIED
BY
H. R. Van Deventer
ATTORNEY Patented June 2, 1931

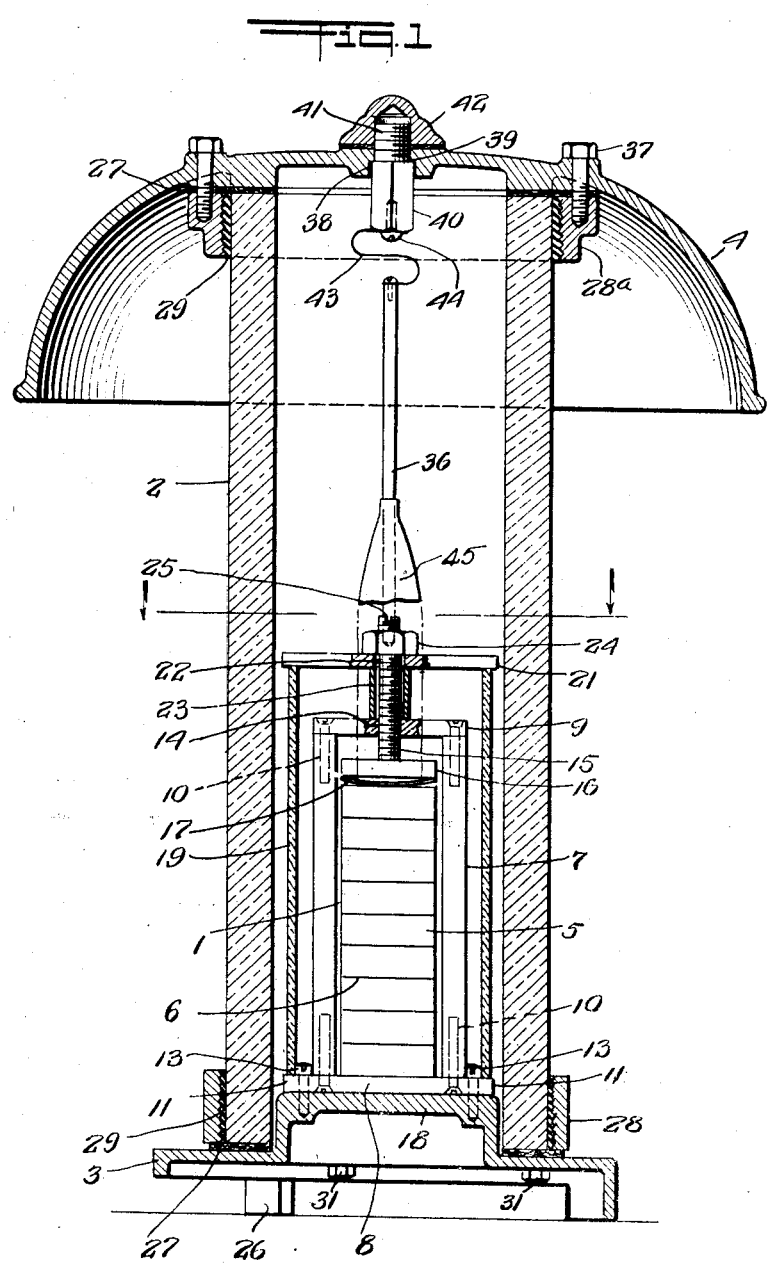

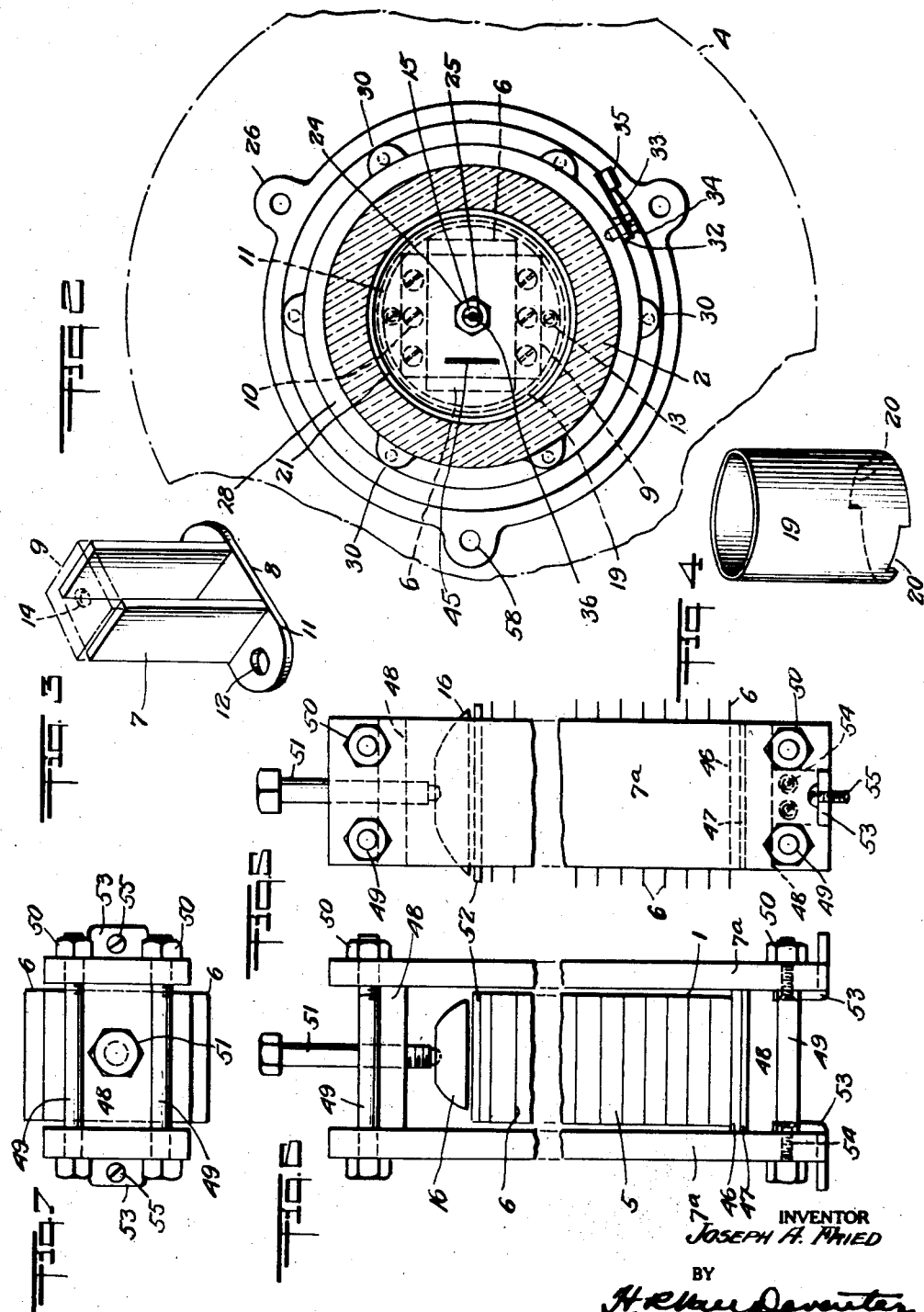

1,808,031

UNITED STATES PATENT OFFICE

JOSEPH A. FRIED, OF FLUSHING, NEW YORK, ASSIGNOR TO DUBILIER CONDENSER CORPORATION, OF NEW YORK, N. Y., A CORPORATION OF DELAWARE

ELECTRICAL CONDENSER

Application filed October 22, 1924, Serial No. 745,231. Renewed March 5, 1927.

This invention relates-to improvements in electrical condensers, especially condensers for utilization in connection with electrical transmission lines.

The employment of power lines for communication, as by sending and receiving intelligence, has long been regarded as desirable; and though numerous methods of coupling telephone systems to high tension power lines have been attempted, the method of coupling by condensers has proved to be the most practical and efficient.

An object of this invention is to provide an electrical condenser designed particularly for use with suitable devices to enable impulses to be sent or received over power transmission lines, to convey signals, to afford remote control of various kinds of apparatus, or to answer any other purpose.

A further object of this invention is to provide a condenser of the proper construction, with a housing of sufficient mechanical strength to give ample protection to the parts of the condenser within and maintain the condenser in operative condition under all conditions of service.

Another object of this invention is to provide a condenser with a container or housing built to permit the condenser to be set up in outdoor installations, without danger of interference or impairment by inclement weather.

These and additional objects and advantages of the invention will be made clear in the following description, taken with the accompanying drawings, which illustrate one or more concrete embodiments of the ideas which this invention embraces. But the disclosure is of course explanatory only, and resort may be had to changes in detail not necessarily shown herein, but consistent with the scope and spirit of this invention as defined by the broad and general meanings of the terms in which the appended claims are expressed.

On said drawings,

Figure 1 is a longitudinal sectional view of a condenser within its housing according to the invention;

Figure 2 is a horizontal section on the line 2—2 of Figure 1, looking in the direction of the arrows;

Figure 3 is a perspective view of a clamp for securing my condenser in place in its housing.

Figure 4 is a perspective view of an interior sleeve enveloping said condenser in the housing therefor;

Figures 5, 6 and 7, are respectively a side view, a face view, and a top view of an alternative form of clamp employed with the condenser; and Figure 8 is a perspective view of a number of improved condensers according to this invention, arranged in a stack to give the capacity and voltage required.

On the drawings, the same numerals identify the same parts throughout.

I show at 1 the body of a condenser enclosed within a housing 2. This housing is preferably tubular in form, and round in cross-section, so that it has the shape of an open-ended cylinder; and preferably it is made of some suitable insulating material such as porcelain. It is obvious, however, that a metallic housing which is coated with enamel, or otherwise insulated, could be used. At its lower end it rests upon and is closed by a metallic base 3; the opposite or upper end being capped by an umbrella shaped hood cover 4 that is also preferably of metal; this hood being of such size that it projects beyond the periphery of the housing, and is curved so that it extends towards the base 3; that is, in a downward direction when the housing and the condenser are in upright position, the rim of the hood thus encircling the housing between the upper and lower ends thereof. When this design of condenser is mounted out of doors, the hood 4 acts as a very efficient rain shield and keeps water from running down the outside of the housing 2 from the top thereof. Thus, the liability of losses and the danger of short-circuiting by water or other liquids running in a continuous stream from the top of the housing 2 where the metallic shield 4 is placed, down to the metallic base 3, is greatly reduced. The particular construction of the condenser 1 may be varied according to requirements and I have illustrated it only to show that it is made up of a number of sections 5, each consisting of sheets or plates of electrically conductive material insulated from each other, the sections being separated by insulator plates 6. The sections can be connected in series or in other ways, and the pile or stack of sections constituting the condenser 1 is held in position by a clamp having sides 7, a bottom 8, and a top 9 between which the stack of the condenser 1 is compressed. All the parts of this clamp are likewise preferably of insulation of the necessary mechanical strength, such as canvas bakelite for instance; and the sides of this clamp are secured to the bottom 8 by screws 10 which may engage reinforced portions of the sides to hold the sides 7 fast to the bottom, and the top 9 may be fastened to the upper ends of the sides in the same way. The bottom 8 of the clamp has extensions projecting out from the lower ends of the sides as shown particularly at 11 in Figure 3; and these extensions 11 have openings 12 to give passage to binding screws 13 so that the clamp with the condenser stack in it can be made fast to the base 3. In the top 9 of the clamp is an opening 14 which is threaded to receive the stem of a bolt 15, passing through the top 9 to the inside of the clamp and bearing upon a pressure block 16 at the upper end of the stack of the condenser; a curved spring plate 17 preferably of resilient metal being disposed between the pressure block 16 and the top section 5 of the condenser, so that when the bolt 15 is screwed tight, the pressure block 16 will press the spring element 17 out flat, and the force of compression will, therefore, be distributed evenly over the entire area of the sheets of electrically conductive material and dielectric in the stack, from top to bottom. As shown particularly in Figure 1 the central part of the base 3 is raised, providing a flat top protuberance 18, and upon the surface of this protuberance the clamp with the condenser seated in it is secured by the fastening bolts or screws 13.

I prefer to provide the condenser and the clamp in the housing 2 with a sleeve or cover 19, this cover having preferably the form of a tube of bakelite or some other insulating material and being large enough to envelope the clamp and condenser completely; sufficient space between the clamp and the inner wall of the housing 2 being provided to receive this tube. As indicated in Figures 1 and 3, the outer ends of the extension 11 have the same curvature as the periphery of the protuberance 18, and the tube or cover 19 is preferably in the form of a cylinder of no greater diameter than the diameter of the circular protuberance 18; this tube having recesses 20 at diametrically opposite points in its lower end to enable it to be fitted over the extensions 11 of the bottom 8 of the clamp and thus rest upon the surface of the protuberance 18 on both sides of the clamp. The tube is closed at its upper end by a cover 21 having a smooth opening 22 therein which clears the stem of the bolt 15, and between the top 9 and the clamp and the cover 22 of the tube, is a spacing sleeve 23 loosely encircling the bolt 15. On the top of the cover 21, the bolt 15 receives a binding nut 24 and the upper end of the bolt may have a recess or kerf 25, or be made square, if desired, so that it can be engaged and turned by a tool. With the clamp and the condenser in it seated upon the base 3, the rotation of the bolt 15 can be caused to press down the block 16 and the spring element 17, to compress the sections of the condenser; and by the turning up of the nut 24, the cap 21 is made fast and caused to press down firmly upon both the sleeve or tube 19 and the loose bushing 23. Thus the lower end of the tube 19 is held firmly against the central platform 18 of the base 3 and pressure is also exerted on the top 9 of the clamp through the bushing 23; while the condenser is kept under compression by the bolt or screw 15, having screw-threaded engagement with the opening 14 in the top 9.

As indicated in Figure 1 the protuberance 18 extends into the lower end of the porcelain housing 2 and the base 3 may be provided with feet 26 on which the entire structure rests. To attach the base 3 and housing 2 permanently together, and at the same time to seal the housing against the entrance of moisture and other foreign substances, I place a washer of cork or any other suitable substance 27 between the base 3 and the adjacent end of the housing 2, and I secure around the housing at its lower end, a metallic ring 28 which may be held on by cement 29 or in any other feasible way. The ring 28 has enlargements 30 (see Figure 2) on its outer surface, these enlargements being spaced at equally distant points around the periphery of the ring and screws 31, shown in Figure 1, pass through the base 3 from below and enter threaded bores formed in the enlargements 30 to make the base fast with the housing 2; these bores being indicated in dotted lines in Figure 2. The lower end of the housing 2 and the base 3 are thus rigidly connected together, but by removing the screws 31, the base and housing can readily be detached from each other. The lower terminal of the condenser can be made fast to the base 3 by leading out this terminal and turning it under the bottom 8 of the clamp, thus securing it on the top of the central part 18 of the base, and the ring 28 may also carry a projection 32 to which is fastened a spring clip 33 by a screw 34, the clip 33 having lugs 35 which can be bent around the end of a conductor, to fasten the conductor to the lug and thus connect the lower end of the condenser into circuit.

The opposite or upper terminal of the condenser 1 may be caused to make contact with the metallic spring plate 17 and connection with the opposite extremity of the outside circuit may be made through the bolt 15, and a rod 36 which is in electrical connection with the metallic shield or hood 4. I may bore out or recess the upper end of the bolt 15 so that the rod 36 can be received in this recess, as indicated in Figures 1 and 2, block 16, too, being of conductive material.

At the upper end of the housing 2 and secured in the same manner as the ring 28 at the lower end, is a ring 28a encircling the housing, the upper face of this ring being flush with the upper end of the housing and on the upper end of the ring and the housing rests another seal or gasket 27 to pack the joint between the upper end of the housing, and the shield 4. The shield as indicated in Figure 1, rests upon the gasket 27 and bolts 37 passing through openings in the hood 4 engage threaded apertures in the ring 28a to make the hood 4 fast. At the center, the hood has an aperture 38 provided with a shoulder 39 against which seats the head 40 of a bolt 41, this bolt passing through the hood and being engaged by a nut 42 on the top of the hood to hold it tight. Engaging at its opposite ends with the top of the rod 36 and the inner end of the head 40, is an S-shaped spring of metal 43, screws 44 being employed to pass through holes in the ends of this spring 43 and into threaded openings in the head 40 and the top of the rod 36, to hold this spring strip in position. It acts to press the rod 36 down into the recessed end of the screw or bolt 15. Thus the condenser can be connected through the bolt 15 and rod 36 to the hood 4 and to the hood another circuit conductor can be attached, and, if desired, I may use an electrically conductive strip 45 which, as shown in Figure 1, embraces the rod 36 with its upper end, and extends downward through a slot indicated in Figure 2, in the cap or top 21, and past the edge of the top 9 of the clamp, the lower end of this strip being turned in under the element 17 to establish contact with the adjacent terminal of the condenser. In Figure 1, the strip 45, below the upper portion, is shown in broken lines only to avoid obscuring the bolt 15 and the other parts adjacent same.

Figures 5, 6 and 7 show another form of clamp which may be used in place of the clamp indicated in Figures 1 and 3. The clamp of the three figures mentioned comprises a pair of sides 7a of insulation, with spacing pieces or plates 46, 47 and 48 between them adjacent their lower ends, and a spacing piece or block also between the two sides adjacent their upper ends, headed bolts 49 passing through the two sides at the upper and lower ends across the adjacent faces of the blocks or pieces 48 and being engaged by nuts 50 to hold the sides and spacing pieces together; that is, to make the sides 7a grip the opposite edges of the pieces 46, 47 and 48. The condenser consisting of the sections 5 rests upon the lower block 48 and through the upper block 48 passes a headed bolt 51 which engages a pressure block 16 and serves the same purpose as the bolt 15 above-mentioned. Below the compression block 16 may be a compression plate 52, and a spring element similar to the spring element 17 may be included if desired. In Figures 5 and 7, the separator plates 6 are shown extending beyond the opposite edges of the sides 7a, as these plates are longer than the width of these sides. At the bottom of the clamp, the lower ends of the sides 7a have angle pieces 53 secured to the inner faces of the sides by screws 54 and extending laterally outward through notches in the lower ends of the sides to serve as feet on which the clamp may be stood when it is placed upon the base 3. These feet are perforated to give passage to screws 55 which serve the same purpose as the screws 14.

Figure 8 shows an arrangement in which a number of condensers of the structure above described are combined into a rack or frame to afford the required voltage and capacity. This figure presents three insulating supports 56 connected by bars 57 which may be of metal and above each support 56, is a column of housings 2, each with a base 3 and a hood 4, and with a condenser inside. Thus, the condensers of each column are connected in series, because the metallic base of one housing makes contact with the hood 4 of the one immediately below it. The hoods 4 of the uppermost housings of the columns of condensers are joined by similar connecting rods or bars 57, and on top of the entire structure is a frame 59 of electrically conductive material to which a conductor 60 may be joined. The lowermost condensers of each column are in electrical connection through the metallic bases 3, with the connecting bars 57, and thus while the condensers of each column are in series, the condensers of the different columns are in parallel, and when a conductor is joined to any one of the rods 57 resting upon the insulating supports 56, the entire structure of condensers can be connected in circuit for operation. At the top of each column below the frame 60 may be an encased fuse indicated at 61.

I may, of course, fill the housing with wax or any other suitable insulating compound which may pervade all the interior spaces, so as to close up the recesses between the sides of the body of the condenser and the clamp, and between the clamp and condenser and the tube 19, as well as the remaining inside space of the housing 2; and, further, I may make the stack of greater height, if desired, so that it will more completely occupy the interior of the housing and leave less unoccupied space between the top of the condenser and the hood 4.

The use of insulation for the clamp gives a number of important advantages. If metal were employed the sides of the clamp would have to be spaced farther from the exterior of the condenser to give as great a break-down distance as possible, and whatever break-down distance were feasible with metal in the clamp would be less than is afforded when the clamp is of insulation. Thus the amount of space available in the construction of this condenser can be well utilized and to a better extent than if metal for the clamp were employed; and the distributed capacity is lessened and the loss is reduced.

Having described my invention, what I believe to be new and desire to secure and protect by Letters Patent of the United States is:—

1. The combination of a housing, a base to which the housing is secured, a condenser in the housing, a clamp affixing the condenser to the base and connected directly to the base, and a cover in the housing for the condenser, the cover being made fast to said clamp.

2. The combination of a tubular casing, rings encircling the opposite ends of said housing, a base attached to one end of the housing through the adjacent ring, a hood similarly attached to the opposite end of the housing, and a condenser inside of the housing and connected to both the base and the hood.

3. The combination of a tubular housing, a base having a central protuberance projecting into the housing, a clamp directly engaging the base, and a condenser secured to said protuberance.

4. The combination of a tubular housing, a base closing one end of the housing, said base having a central protuberance which extends into the adjacent end of the housing, a clamp secured to said protuberance, a condenser seated in said clamp, and a cover enveloping the condenser and clamp, the cover resting on said protuberance and having recesses to enable the adjacent end of the cover to clear the clamp.

5. The combination of a tubular housing, a base for one end of the housing, a condenser in the housing, a clamp secured to the base for holding the condenser in position, a cover for the condenser and clamp resting on the base, a cap for the cover, and a screw and nut engaging the clamp and cap, to hold the cover.

6. The combination of a housing, a base for one end of the housing, a condenser, a clamp engaging the base to hold the condenser in position, a cover enveloping the clamp and condenser, a cap for the cover, a screw engaging the clamp and carrying a nut to compress the cover, and a terminal attached to the condenser and extending through said cover.

7. The combination of a tubular housing, a base for one end of the housing, a condenser in the housing, a clamp secured to the base for holding the condenser in position, a cover for the condenser and clamp resting on the base, a cap for the cover, and a screw and nut engaging the clamp and cap to hold the cover, said screw being of conductive material and connected to the adjacent end of the condenser to serve as a terminal therefor.

8. The combination of a housing, a base for one end of the housing, a hood of conducting material attached to the opposite end of the housing, a condenser supported upon the base, a rod between the condenser and the hood, and a spring element pressing the rod towards the condenser.

9. The combination of a housing, a base for one end of the housing, a condenser, a clamp for holding the condenser fast to the base, a cover for the condenser and clamp, a cap for the cover, a screw passing through the clamp and the cap, a nut on the screw to engage the cap, and a bushing encircling the screw between the cap and the clamp.

10. A clamp for a condenser comprising a pair of sides, separator pieces between said sides adjacent the opposite ends, bolts passing through said sides to cause them to grip the opposite edges of said separator pieces, and a compression bolt passing through one of said pieces to force the body of the condenser towards the other, one end of each of said sides having angle pieces attached to its inner face, said angle pieces extending laterally through recesses in the ends of said sides beyond the outer faces of said sides and being perforated at their extremities to enable the clamp to be attached to a support.

11. The combination of a housing, a base closing one end of the housing, a hood of conductive material attached to the opposite end of the housing, and a condenser mounted upon the base, and having a relatively great space between it and said hood, together with a flexible connection located substantially in the middle of said space between the condenser and said hood.

12. An electrical structure comprising a line of housings arranged end to end, one or more lines of housings similarly arranged adjacent the first line, each housing having a metallic base at one end and a metallic cover at the other end, with a condenser inside connected at its opposite terminals to said base to said cover, the base of one housing being in contact with the cover of the adjacent housing, and transverse connections uniting some of the bases and some of the covers of the different lines of housings.

13. An electrical structure comprising a line of housings arranged end to end, one or more lines of similarly arranged housings adjacent the first housings, each housing containing a condenser and having a metallic base at one end and a metallic cover at the other end, the condenser being connected by its opposite terminals to said base and said cover, the housings of each line also having a base of insulation, the metallic bases of the housings of each line adjacent said insulation being electrically connected, and the covers of the housings of each line at the opposite ends thereof being likewise in electrical connection with one another.

14. An electrical structure comprising a plurality of adjacent columns of condenser units, insulating supporting means for said structure, each of the columns comprising one or more condensers, and one or more transverse braces between the columns whereby the same are maintained in fixed relation to form a unitary structure.

15. An electrical coupling unit comprising columns of superposed housings, condensers within the housings, terminal members at each end of the housings, and transverse supporting members between certain of the said terminal members whereby the columns of housings are maintained in spaced fixed relation to form a unitary structure.

16. An electrical capacity unit comprising a plurality of adjacent columns of superposed condenser elements, each condenser element comprising an insulating housing having a metallic base and a metallic cover, a condenser within the housing having its opposite terminals connected to the base and cover, the cover of one element being connected to the base of the element above, transverse conductive members connected between certain of the bases and between certain of the covers of the condenser elements of adjacent columns in such manner that the condenser elements form a unitary mechanical and electrical unit.

17. In a high tension condenser installation, the combination with a plurality of stacks of insulation-sided metal-ended condenser units electrically and mechanically connected together end to end and connected in series in the respective stacks; of high potential insulating mounting supports at the bottoms of the respective stacks of units; and metal tie-rods mechanically and electrically connecting in parallel the metal ends of the condenser units of the respective stacks of units.

18. A high tension condenser including condenser sheets stacked together, a casing enclosing said stack and comprising two metallic end structures and an intermediate insulating portion secured to said end structures, the latter being connected to the terminals of the enclosed stack; and a corona shield supported on and electrically connected to one of said metal end structures and located outside the casing between the two end structures.

Signed at New York in the county of New York and State of New York this 21st day of October, A. D. 1924.

JOSEPH A. FRIED.